US009009675B2

(12) United States Patent
Corthesy et al.

(10) Patent No.: US 9,009,675 B2
(45) Date of Patent: Apr. 14, 2015

(54) VERIFICATION OF COMPLEX WORKFLOWS THROUGH INTERNAL ASSESSMENT OR COMMUNITY BASED ASSESSMENT

(75) Inventors: Stephanie M. Corthesy, Zurich (CH); Pablo Meyer Rojas, Brooklyn, NY (US); Raquel Norel, New York, NY (US); John J. Rice, Mohegan Lake, NY (US); Ajay K. Royyuru, Congers, NY (US); Joerg J. Sprengel, Baden (DE); Gustavo A. Stolovitzky, Riverdale, NY (US); Thomas Bonk, Köln (DE); Julia Hoeng, Neuchatel (CH); Manuel Peitsch, Peseux (CH); Katrin Stolle, Köln (DE)

(73) Assignees: International Business Machines Corporation, Armonk, NY (US); Philip Morris Products S.A. (CH)

( * ) Notice: Subject to any disclaimer, the term of this patent is extended or adjusted under 35 U.S.C. 154(b) by 390 days.

(21) Appl. No.: 13/426,104

(22) Filed: Mar. 21, 2012

(65) Prior Publication Data
US 2013/0254772 A1 Sep. 26, 2013

(51) Int. Cl.
*G06F 9/44* (2006.01)
*G06Q 10/06* (2012.01)

(52) U.S. Cl.
CPC .................................. *G06Q 10/0633* (2013.01)

(58) Field of Classification Search
None
See application file for complete search history.

(56) References Cited

U.S. PATENT DOCUMENTS

| 7,509,235 | B2 | 3/2009 | Bonissone et al. |
| 7,836,004 | B2 | 11/2010 | Roth et al. |
| 2003/0018512 | A1* | 1/2003 | Dortmans ........................ 705/9 |
| 2003/0050821 | A1* | 3/2003 | Brandt et al. ..................... 705/9 |
| 2004/0187089 | A1* | 9/2004 | Schulz .......................... 717/101 |
| 2005/0055246 | A1* | 3/2005 | Simon .............................. 705/2 |
| 2005/0257136 | A1* | 11/2005 | Charisius et al. ............. 715/511 |
| 2006/0112388 | A1* | 5/2006 | Taniguchi et al. ............ 718/100 |

(Continued)

OTHER PUBLICATIONS

Usama Fayyad, et al., "The KDD Process for Extracting Useful Knowledge from Volumes of Data," Communications of the ACM; vol. 39, No. 11; pp. 27-34, Nov. 1996.

(Continued)

*Primary Examiner* — Camquy Truong
*Assistant Examiner* — Mehran Kamran
(74) *Attorney, Agent, or Firm* — Cantor Colburn LLP; Vazken Alexanian

(57) ABSTRACT

A method of implementing verification of a complex workflow includes partitioning the workflow into modules, wherein the modules have inputs, processing steps and outputs; selecting, from the workflow, one of the partitioned modules for independent verification by challenge thereof; running, with a computing device, a challenge of the selected module, the challenge comprising comparing reference outputs to outputs of the selected module, wherein reference inputs are received by the selected module and the reference outputs are generated using the reference inputs and one of an ideal performing module or a well-established module; determining whether outputs of the selected module meet verification criteria with respect to the reference outputs, and based on the determining, implementing one of: declaring the selected module verified; subdividing the selected module into smaller modules and repeating the challenge on the smaller modules; or declaring the selected module not verified.

18 Claims, 4 Drawing Sheets

(56) References Cited

U.S. PATENT DOCUMENTS

| | | | |
|---|---|---|---|
| 2006/0242002 A1* | 10/2006 | Sun et al. | 705/11 |
| 2007/0050759 A1* | 3/2007 | Boing et al. | 717/135 |
| 2007/0106541 A1* | 5/2007 | Raisanen | 705/7 |
| 2007/0156878 A1* | 7/2007 | Martin et al. | 709/223 |
| 2007/0174342 A1* | 7/2007 | Maeda et al. | 707/104.1 |
| 2007/0244840 A1 | 10/2007 | Carroll | |
| 2007/0288520 A1* | 12/2007 | Hatanaka et al. | 707/104.1 |
| 2008/0155540 A1* | 6/2008 | Mock et al. | 718/100 |
| 2008/0249816 A1* | 10/2008 | Khalilian et al. | 705/7 |
| 2008/0313024 A1* | 12/2008 | Kunichika et al. | 705/11 |
| 2009/0037569 A1* | 2/2009 | O'Loughlin et al. | 709/224 |
| 2009/0106059 A1* | 4/2009 | Megiddo et al. | 705/7 |
| 2009/0204471 A1* | 8/2009 | Elenbaas et al. | 705/9 |
| 2009/0210282 A1* | 8/2009 | Elenbaas et al. | 705/9 |
| 2009/0281830 A1 | 11/2009 | McNames et al. | |
| 2009/0282417 A1* | 11/2009 | Yoshida | 718/104 |
| 2010/0049568 A1* | 2/2010 | Louie et al. | 705/8 |
| 2010/0050183 A1* | 2/2010 | Ogura | 718/106 |
| 2010/0180345 A1* | 7/2010 | Manchala et al. | 726/26 |
| 2010/0281462 A1* | 11/2010 | Festa | 717/108 |
| 2010/0304983 A1 | 12/2010 | Fortmann et al. | |
| 2011/0131448 A1* | 6/2011 | Vasil et al. | 714/19 |
| 2011/0181596 A1* | 7/2011 | Jacobs | 345/440 |
| 2011/0225565 A1* | 9/2011 | van Velzen et al. | 717/114 |
| 2011/0231812 A1* | 9/2011 | Maine et al. | 717/106 |
| 2012/0029978 A1* | 2/2012 | Olding et al. | 705/7.42 |
| 2012/0078679 A1* | 3/2012 | Hodges et al. | 705/7.27 |
| 2012/0078809 A1* | 3/2012 | Day | 705/348 |
| 2012/0240187 A1* | 9/2012 | Childress et al. | 726/1 |
| 2012/0246122 A1* | 9/2012 | Short et al. | 707/690 |
| 2012/0265573 A1* | 10/2012 | Van Pelt et al. | 705/7.14 |
| 2012/0284090 A1* | 11/2012 | Marins et al. | 705/7.39 |
| 2012/0284724 A1* | 11/2012 | Alexander | 718/102 |
| 2012/0296687 A1* | 11/2012 | Satyanarayana et al. | 705/7.22 |
| 2012/0331444 A1* | 12/2012 | Szpak et al. | 717/105 |
| 2013/0029769 A1* | 1/2013 | Lee | 463/42 |
| 2013/0227285 A1* | 8/2013 | Bracher et al. | 713/168 |
| 2013/0231969 A1* | 9/2013 | Van Pelt et al. | 705/7.13 |
| 2013/0247051 A1* | 9/2013 | Sun et al. | 718/102 |

OTHER PUBLICATIONS

Gustavo Stolovitzky, et al., "Lessons From the DREAM2 Challenges: A Community Effort to Assess Biological Network Inference," The Challenges of Systems Biology; Ann. N.Y. Acad. Sci. 1158: pp. 159-195; 2009.

Daniel Marbach, et al., "Revealing Strengths and Weaknesses of Methods for Gene Network Inference," PNAS; vol. 107; No. 14; pp. 6286-6291; Apr. 2010.

Pablo Meyer, et al., "Verification of Systems Biology Research in the Age of Collaborative Competition," Computational Biology; Commentary; Nature Biotechnology; vol. 29; No. 9; pp. 811-815; Sep. 2011.

John Moult, et al., "A Large-Scale Experiment to Assess Protein Structure Prediction Methods: Introduction," Proteins: Structure, Function, and Genetics 23; ii-iv; pp. 1-3; 1995.

John Moult, "The Current State of the Art in Protein Structure Prediction," Current Opinion in Biotechnology; 7, pp. 422-427; 1996.

Robert J. Prill, et al., "Towards a Rigorous Assessment of Systems Biology Models: The Dream3 Challenges," Dream3 Overview and Analysis; Open Access; PLoS One; vol. 5; Issue 2; e9202; pp. 1-18; Feb. 2010.

David Shortle, "Protein Fold Recognition," Nature Publishing Group-NPG; News and Views; Structural Biology; vol. 2; No. 2; pp. 91-93; Feb. 1995.

Gustavo Stolovitzky, et al., "Dialogue on Reverse-Engineering Assessment and Methods: The Dream of High-Throughput Pathway Inference," Ann. N.Y. Acad. Sci. 1115: 1-22; pp. 1-23; 2007.

* cited by examiner

VERIFICATION OF COMPLEX WORKFLOWS THROUGH INTERNAL ASSESSMENT OR COMMUNITY BASED ASSESSMENT

BACKGROUND

The present invention relates generally to verification of complex workflows and, more particularly, to evaluating the quality of a complex workflow, for example those arising in research and development, through the subdivision of the complex workflow into verifiable modules, whose verification is done by internal assessment or by leveraging a community-based assessment.

A complex workflow consists of a number of inputs in the form of (but not limited to) data, signals or material, for example, and a set of processing steps which yield a number of desired outputs in the form of signals, materials or data. These outputs depend both on the inputs and on the processing steps in complex and nontrivial ways. Hence, the goodness or appropriateness of the overall workflow design cannot be assessed using simple or trivial metrics based on the final output. This is so because if the final output is not what is desired, it would be very difficult to understand which step or steps in the complex workflow are at the root of the failure to produce the expected outputs.

In the present context, verification generally refers to the process of evaluating a system, component or other product or research output at the end of its development cycle to determine whether it meets projected performance or accuracy goals (http://medical-dictionary.thefreedictionary.com/verification). Another definition of verification in the context of research is what is usually considered as positive or negative controls. Here, verification is the determination that a module accurately reproduces well established (positive or negative) results.

Formal verification may be helpful in proving the correctness of systems such as, for example, cryptographic protocols, combinational circuits, digital circuits with internal memory, and software expressed as source code (see, e.g., http://en.wikipedia.org/wiki/Formal_verification). The verification of these systems is done by providing a formal proof on an abstract mathematical model of the system, with the correspondence between the mathematical model and the nature of the system being otherwise known by construction. Examples of mathematical objects often used to model systems include finite state machines, labeled transition systems, Petri nets, timed automata, hybrid automata, process algebra, formal semantics of programming languages such as operational semantics, denotational semantics, axiomatic semantics and Hoare logic.

While formal (mathematical or logical) verification may be helpful in proving the correctness of systems with limited scope (e.g., finite state machine, source code, cryptography, etc.), the general problem of verifying the correctness of a complex research plan is more ad hoc with few established techniques. The goodness or fitness of a complex workflow cannot be estimated using simple or trivial metrics based on the overall process. Indeed, verification can be difficult and time consuming, and even in systems with limited scope, a module or component may not be verified for absolute correctness unless that particular module or component is highly critical for system reliability or security. Therefore, methods that provide for a more approximate verification will be needed for complex systems. Approximate verification methods often include a reference or stereotyped input that tests only a limited range of the input state space. The output is tested against a known or idealized output.

SUMMARY

In an exemplary embodiment, a method of implementing verification of a complex workflow includes partitioning the workflow into modules, wherein the modules have inputs, processing steps and outputs; selecting, from the workflow, one of the partitioned modules for independent verification by challenge thereof; running, with a computing device, a challenge of the selected module, the challenge comprising comparing reference outputs to outputs of the selected module, wherein reference inputs are received by the selected module and the reference outputs are generated using the reference inputs and one of an ideal performing module or a well-established module; determining whether outputs of the selected module meet verification criteria with respect to the reference outputs, and based on the determining, implementing one of: declaring the selected module verified; subdividing the selected module into smaller modules and repeating the challenge on the smaller modules; or declaring the selected module not verified.

In another embodiment, a computer readable storage medium having computer readable instructions stored thereon that, when executed by a computer, implement a method of verification of a complex workflow, the method including partitioning the workflow into modules, wherein the modules have inputs, processing steps and outputs; selecting, from the workflow, one of the partitioned modules for independent verification by challenge thereof; running, with a computing device, a challenge of the selected module, the challenge comprising comparing reference outputs to outputs of the selected module, wherein reference inputs are received by the selected module and the reference outputs are generated using the reference inputs and one of an ideal performing module or a well-established module; determining whether outputs of the selected module meet verification criteria with respect to the reference outputs, and based on the determining, implementing one of: declaring the selected module verified; subdividing the selected module into smaller modules and repeating the challenge on the smaller modules; or declaring the selected module not verified.

BRIEF DESCRIPTION OF THE SEVERAL VIEWS OF THE DRAWINGS

Referring to the exemplary drawings wherein like elements are numbered alike in the several Figures.

DETAILED DESCRIPTION

Figure 1A:
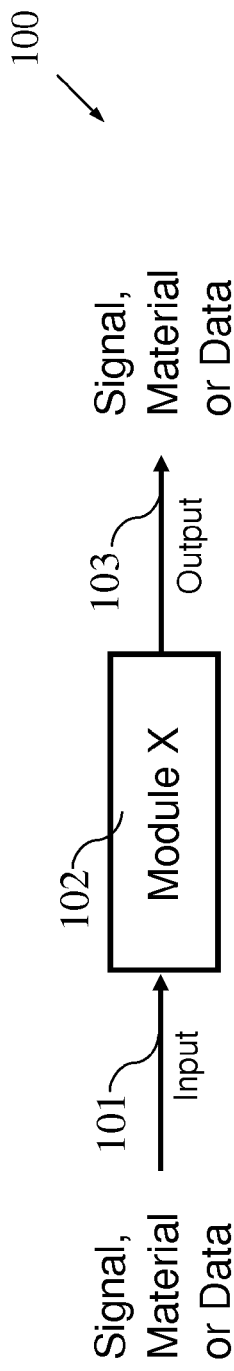
FIG. 1(a) is a basic block diagram illustrating a module in a workflow.

An example of a complex workflow that would benefit from a rigorous verification methodology is a workflow in modern biological research. The inputs are typically high-dimensional, noisy data streams. The noise can come from various sources including biological variability, sample preparation inconsistencies and measurement noise inherent to the sensor instrumentation. The outputs are generally processed and distilled using high complexity algorithms including statistical, graphical and mechanistic models and techniques. Often, such workflows and subsections of workflow (or "modules") lack a clear characterization of their relative strengths and weaknesses on an objective basis. In other words, a question remains as to how to determine that a given module is performing at an acceptable level given that an exhaustive set of reference inputs and outputs are often not available to test for correct behavior. Even a subjective measure of correctness or fitness can be hard to determine.

Recently created practices are breaking new grounds to give rise to a new kind of scientific research quality control. These practices have become well established during the last decade and a half, starting with the pioneering contributions from ongoing efforts such as CASP (Critical Assessment of Techniques for Protein Structure Prediction, which started in 1994)(Moult, Pedersen et al. 1995; Shortie 1995; Moult 1996), KDD (Knowledge Discovery and Data mining, 1995) (Fayyad, Piatetsky-Shapiro et al. 1996), and more recently DREAM (Dialogue for Reverse Engineering Assessment and Methods, 2006)(Stolovitzky, Monroe et al. 2007; Stolovitzky, Prill et al. 2009; Prill, Marbach et al. 2010), to name a few. These efforts met some of the verification needs of scientific research methods with the widespread practice of crowd-sourcing in which communities collaborate by competition. The focus in these and other similar efforts is on an objective assessment of the correctness of the solutions submitted in response to a well-defined scientific question.

A key aspect of these popular community-based approaches is the double-blind nature of the assessment. Neither the organizers of the assessment exercise know what methods are being scored, nor do the predictors know the solutions. Such a double blind processes are not new, and indeed are routinely used in clinical trials. However, they could also have an important place in the assessment of academic and industrial research plans, or complex workflow structures.

Accordingly, disclosed herein are method and system embodiments for verifying complex workflows. Complex workflows are common in many domains such as, for example, industrial manufacturing, industrial research and development, academic scientific research and information technology. A complex workflow is defined as a composite set of building-block units connected according to their interdependence in achieving a final objective of the research. Each building block is described by a task to be carried on by specific implementation modules. Each of these implementation modules has inputs, processing steps and a set of desired outputs. The embodiments described herein implement the verification of a complex workflow of building blocks based on the independent verification of each implementation module using a challenge-based assessment. In challenged-based assessment, test inputs and desired outputs are presented to one or more participants. The participants define a module by processing inputs and submitting outputs based on the method they designed. A trusted third party, which has knowledge of the ideal outputs given the inputs in one particular instance, can then score the output produced by the different submitted methods and verify the suitability of a module based on the best submission, or a consensus of all submissions or other methods to integrate desired behaviors of several entries.

The disclosed assessment methodology is designed to assess the correctness and fitness of complex workflows such as those used in scientific, R&D or other workflows in an industrial or academic setting. Correctness and fitness includes, but is not limited to, accuracy, sensitivity, reliability, purity, robustness, reproducibility and freedom from noise or artifacts. This methodology tests the correctness and fitness of the workflow by a "divide and conquer" approach. That is, the workflow is divided into smaller modules that are individually verified by challenges. A model can be verified by performing a challenge against a reference set of inputs and outputs. The terminology "challenge" is used since the assessment is double blind. That is, in ideal embodiments, the challenge participants (those running the module) are blind to the reference output that module should generate (e.g., participants will not know labels to the test samples in a classification task). Similarly, the scorers should be blind as to which submitted method, and corresponding participant, has generated the output to be tested (e.g., which method predicted the labels for the test samples in a classification task). The double blind approach is aimed at preventing biases and artifacts that can occur if the participant or scorers are not blinded to appropriate aspects of the challenge.

In some embodiments, the challenge involves crowd sourcing the solution of the problem to an interested community. Here, the module to be verified is compared against entries submitted from the community. More specifically, a reference input is provided and the outputs are generated based on modules as designed by the participants. The performance of the module to be verified is then compared to each participant's result or an aggregate of a subset of the participants' results. Superior performance against some predefined performance metric can serve as an approximate verification technique.

A central concept is to create challenges that verify the correctness and fitness of modules in the workflow. One type of challenge may be, for example, a comparison between a known or pre-defined reference output versus that of an existing module in need of verification. A second type of challenge may include a community-based assessment in which the output of the module to be verified is compared against those submitted by the community. If all the results are positive, that is, if the complex workflow passes all the tests that its components were submitted to, the credibility of the workflow will be enhanced in the eyes of the groups such as, but not limited to, industry management, the scientific community and the regulatory agencies.

An aspect of development of a challenge is the definition of the reference output, often referred to as the gold standard. Ideally, the gold standard is a known correct reference that can be used to assess new methods, models and data. However, a true and correct standard is not always possible in complex workflows because the ground truth is not generally known, and perhaps is not even measurable. This may be illustrated upon consideration of a set of diseased patients with a corresponding set of gene expression data for each patient. Current medical technical techniques generally do not produce an absolutely perfect diagnosis of diseased versus not diseased states. Hence, the reference data set of patient diagnoses will contain some errors and will not reflect the ground truth. Without the ground truth, a new diagnosis based on gene expression cannot be assessed against a perfect gold standard. Given that a ground truth can not be defined in the typical case, several options are commonly used instead.

Evoking the classical machine learning paradigm, some of the data is released as a training set while the remainder of the data is withheld as a gold standard test set. Philosophically, the ground truth is not known, but the hidden data set will contain some elements of the truth and hence can serve as the reference to assess the goodness or fitness of new methods, models or data.

The second case generates a reference output based on an established method, technology or database that is accepted by the community. Philosophically, the established technology reveals some part of the ground truth, and hence can be used as a reference. However, compared to real ground truth, the reference will be incomplete and with potential errors or shortcomings.

The third case consists on combining numerous data sets, algorithms or techniques, to get a closer estimate of the ground truth. This is the case in the DREAM 5 network inference challenge where the *E. coli* RegulonDB, a compendium of separate experimental results, was used to generate the gold standard. Philosophically, each data modality can be assumed to contain some part of the ground truth. Hence, the combination of modalities will then contain a greater fraction of the ground truth, and thus can serve as good reference to assess newly developed methods.

Figure 1B:
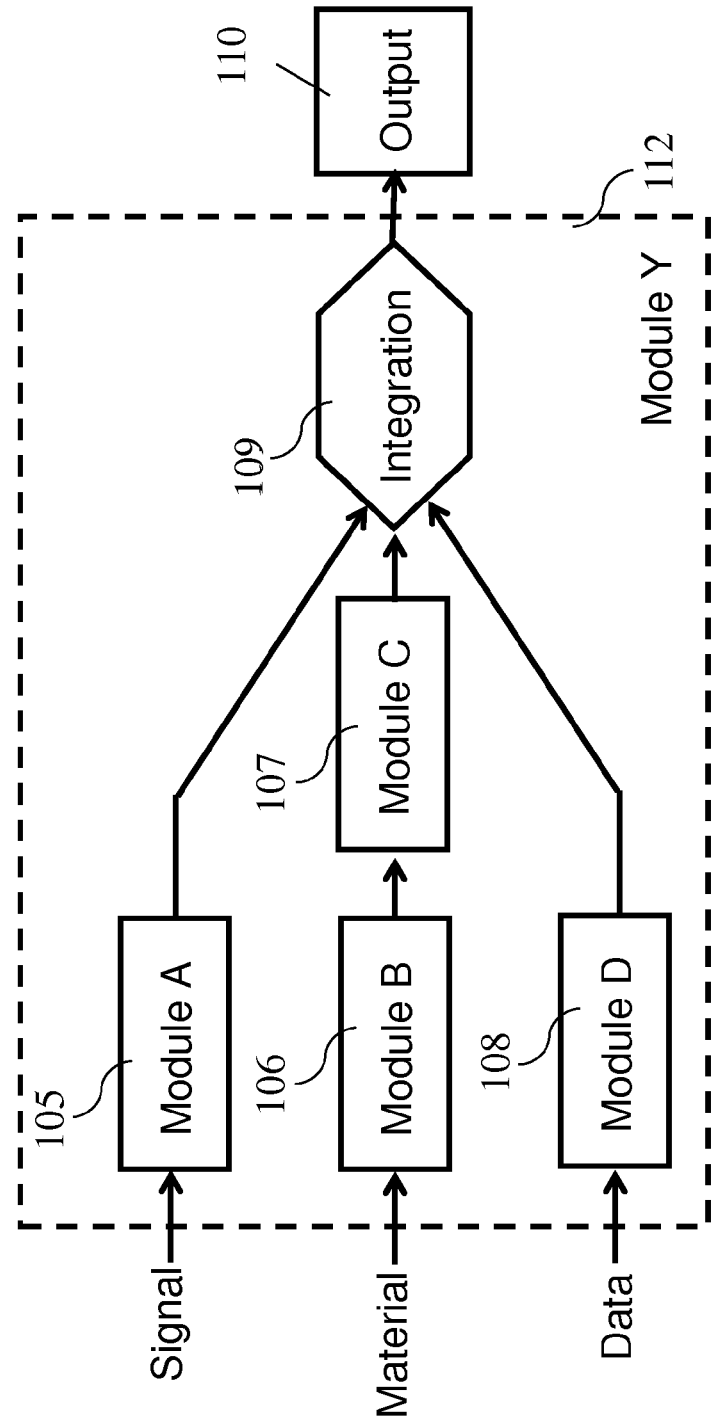
FIG. 1(b) is a block diagram illustrating a complex workflow in which inputs are converted into outputs through a set of modules and integration.

Referring initially to FIG. 1(*a*), there is shown a basic block diagram illustrating a module in a workflow 100 as is common in many domains such as industrial manufacturing, research and development and information technology, for example. Exemplary inputs 101 to the module 102 (labeled "Module X" in FIG. 1(*a*)) may include, but not necessarily limited to, signals, materials and/or data. Such inputs 101 may be received by module 102 by, for example, wires, conduits, optical links, physical transporters material or recorded media, and the Internet. The module 102 performs a non-trivial transformation or manipulation of the inputs to produce an output(s) 103, which may include but not necessarily limited to signals, materials, and/or data. Moreover, the input(s) and output need not consist of the same set of signals, materials, and/or data. The outputs 103 may be transmitted or conveyed by for example, wires, conduits, optical links, and physical transporters material or recorded media.

FIG. 1(*b*) is a more detailed block diagram illustrating an example workflow starting from a set of inputs in the form of data, samples or materials which are processed through modules and eventually integrated into usable outputs. In accordance with one exemplary embodiment, a method of verifying a complex workflow such as the exemplary workflow of FIG. 1(*b*) is described hereinafter. Here, it is assumed that it is possible to conceptualize the data workflow in a composite set of modules and their interconnections. As specifically shown in the example of FIG. 1(*b*), workflow 104 can be composed from modules 105, 106, 107, 108 (labeled Modules A, B, C and D, respectively) and possibly an integrator module 109 of their outputs. For example, Module A 105 could represent different measurement techniques applied to a biological sample. Modules B and C 106, 107, could represent processes of manufacture, for example, while Module D 108 could represent processes of data analysis. In the specific example of FIG. 1(*b*), Modules B and C are in series, which pair acts in parallel with Modules A and D. However, it will be appreciated that organizations other than series and parallel arrangements are also possible in other workflows, depending on the interdependence of the different research modules on one another.

Two observations may be made with respect to the example workflow in FIG. 1(*b*). First, the integration block 109 represents an integration of three inputs into a single output 110. The output 110 could be a simple or complex function of the inputs, and thus the integration block 109 may also be considered as a module. That is, modules are functional units in workflows such that a module has a defined input, internal processing and a defined output. It should be noted, however, that some processing module(s) might not need verification (e.g., a simple step of storing data to a hard disk, or an experimental procedure for which best practices are already in place), but such modules are still represented in the same way as modules with more complex processing. Secondly, modules may be grouped into larger modules. For example, the combination of Modules A, B, C, D, the integration block 109, and their interconnections may be considered as a larger module 112 (Module Y) as shown schematically by the dashed box in FIG. 1(*b*). Such larger modules, however, may be more difficult to verify.

Figure 2:
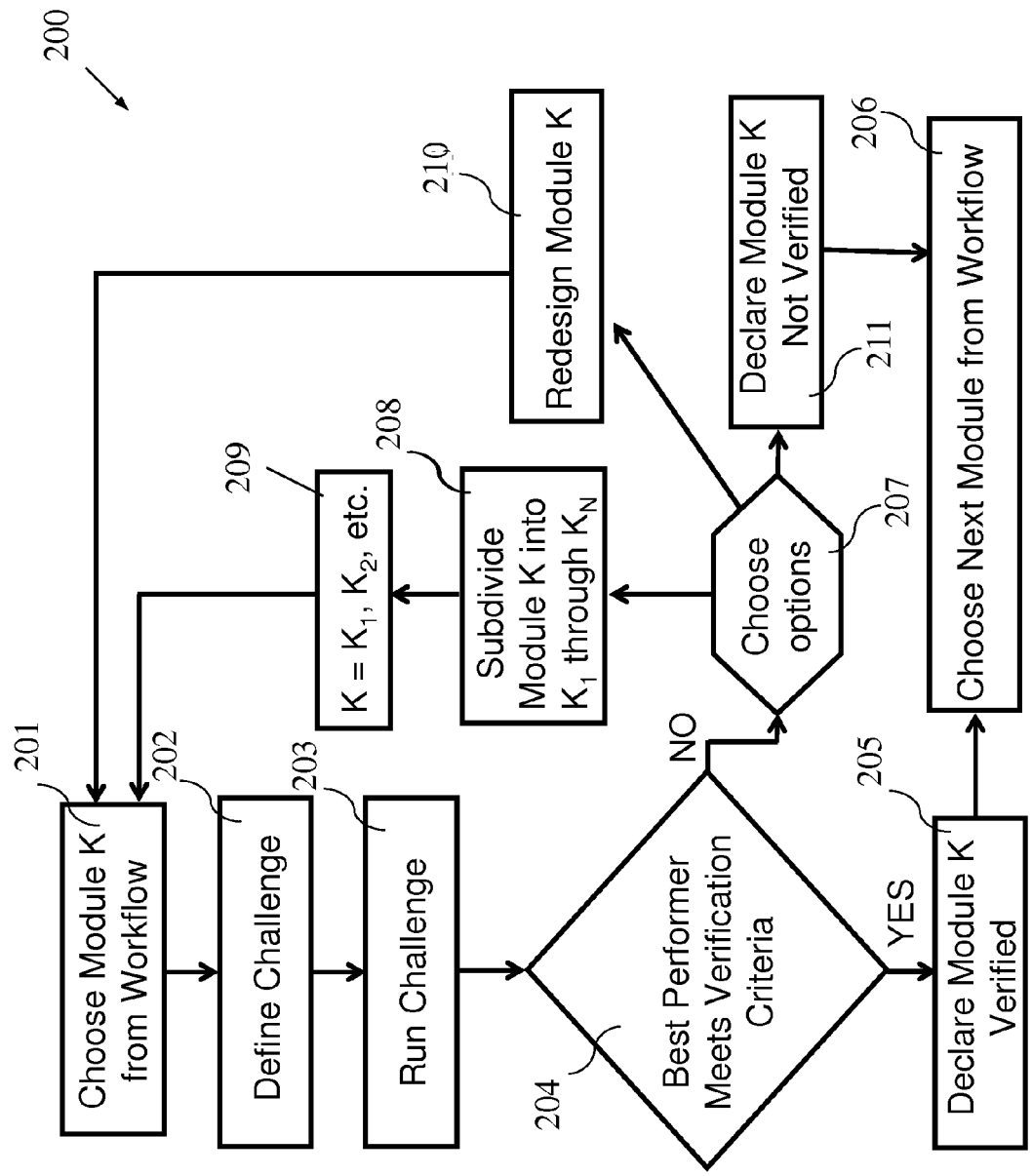
FIG. 2 is a flowchart illustrating a challenge based method for verifying a single module of a larger workflow, in accordance with an exemplary embodiment.

Referring now to FIG. 2, there is shown a flowchart illustrating a challenge based method 200 for verifying a single module of a larger workflow, in accordance with an exemplary embodiment. A given, single module "Module K" may be verified by showing that the module successfully passes the verification criterion in a challenge. If the module does not meet the predetermined verification criteria, it may be subdivided into smaller modules, redesigned, or simply declared unverified. In one embodiment, if Module K competes with other contending modules that perform similar tasks, then the best performing module in the challenge (assuming it meets the verification criterion) will then become the new Module K, replacing the original Module K.

Beginning in block 201, a single Module K is selected from a larger workflow (e.g., such as illustrated in FIG. 1(*b*)). In block 202, a challenge is defined and then run in block 203. Additional information regarding the subdivision and execution of challenges is described in further detail below. After the evaluation of the challenge, a best performer method is declared and, at decision block 204, it is determined whether the best performer method meets the verification criteria. If so, then the best performer module is renamed as Module K, which is then declared verified at block 205 and the next module form the workflow is chosen for verification at block 206.

On the other hand, in the event that there is no best performer for Module K (e.g., no other modules competed in the challenge and the original Module K did not meet the verification criterion) or the best performer solution is not close enough to the desired output, then the method proceeds to block 207 where options are considered and a decision is made. One option is to subdivide the module in smaller modules as indicated in blocks 208 and 209, and repeat the selection and challenge process as described above. Here, it is possible that the subdivision of a larger Module K into smaller Modules $K_1$, $K_2$, etc. may or may not result in verification of the smaller modules. This in turn may establish one or more reasons for the failure of verification of Module K so that any failing sub-module(s) may be redesigned.

Alternatively, the process may proceed to block 210 where the overall Module K is redesigned, for example using a different technology, after which the challenge process as described above is repeated. In still another alternative, the process may simply proceed to block 211 where the module is declared as not verified, and another module from the workflow may be selected for verification. The verification criteria may be evaluated to determine whether the comparison was satisfactory or not. If the latter is the case, more research may be performed in order to create a process which is verified at the end of a similar (though not identical) challenge.

Figure 3:
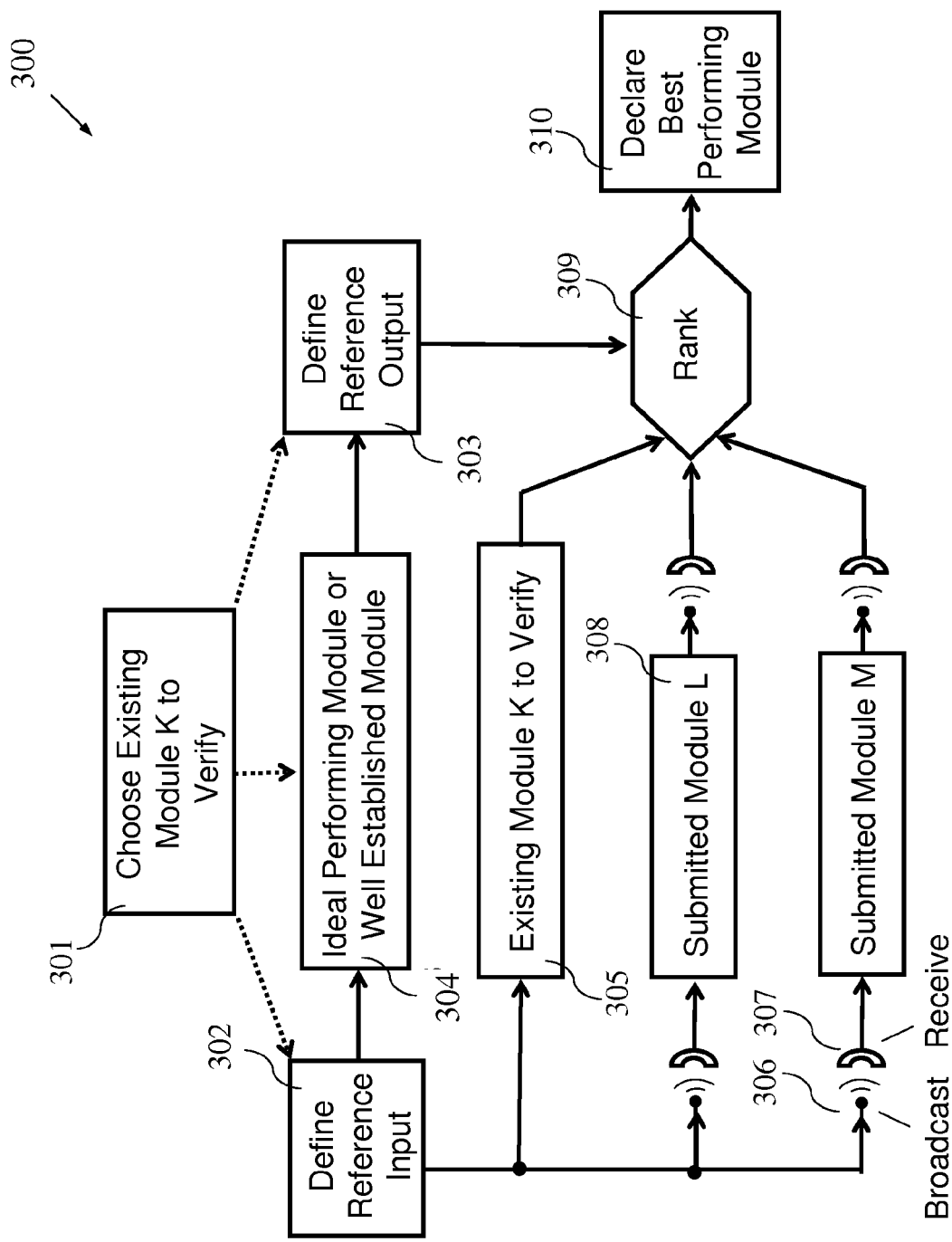
FIG. 3 is a flowchart illustrating running a challenge to verify an existing Module K, in accordance with an exemplary embodiment.

FIG. 3 is a flowchart illustrating a method 300 of running a challenge to verify an existing Module K, in accordance with an exemplary embodiment. In this embodiment, further details are presented with respect to running a challenge. Here, a reference input and reference output are used as benchmark tests for the existing Module K, and submitted Modules L and M (that could potentially outperform Module K) are also considered. A "best performing module" is defined as the module closest to the defined reference output but also within a predefined threshold difference. Otherwise, the best performing Module might be considered good with respect to the competitors but poor with respect to the reference. If Module K is not the best performer in the challenge, then best performing module may replace Module K in the research workflow.

As more specifically depicted in FIG. 3, the method 300 begins at block 301 by choosing an existing Module K from a workflow to verify (similar to block 201 of FIG. 2). The choice of Module K in turn affects the definitions of the reference input (block 302) and the reference output 304, sometimes referred to as the gold standard. The influence of Module K on the reference input, output 304 and processing is illustrated by the dashed arrows. The reference input 302 is defined to query or interrogate the module to establish its fitness or goodness for the purposes designed. The reference output 303 is generated from the reference input 302 by processing by an ideal performing module or, alternatively, by a well-established module 304.

For example, an ideal performing module may be determined by methods including, but not limited to, theoretical modeling, statistical averaging over large datasets, and the use of a priori knowledge. In contrast, a well-established module refers to a method or process that is reduced to practice and accepted by the field or interested community. An exemplary use of a well-established module to generate the reference output may be to verify a newer module versus one that is accepted and considered a standard.

Two general approaches to challenge-based verification are illustrated in FIG. 3. The first approach may be described as "internal assessment". Here, the output of existing Module K is compared against the reference output only, as indicated in block 305. That is, the module to be verified is challenged to perform at the level of the reference output (i.e., the gold standard). A trusted third party with knowledge of the reference outputs, given the reference inputs, may then determine whether Module K performs acceptably close to the reference.

The second approach may be described as "community-based assessment" wherein the defined reference input 302 is presented to a wide community, whose members in turn return outputs based on their own modules. In one embodiment, the challenge is broadcasted 306 (e.g., web-based publication) by the challenge organizers and received 307 by the interested community. Participants may then submit their external modules 308 (e.g., Module L, Module M, etc.), which in turn are evaluated and ranked at block 309 using the defined reference output 303.

If the best performing method and/or a combination or aggregation of methods yields a results close enough to the desired output, a best performing module is declared at block 310. Ideally, the assessment is double blind such that a third party with knowledge of the reference outputs can rank the different submitted outputs without knowledge of the source or underlying module that created the output. If Module K performs acceptably close the reference, then Module K is verified. On the other hand, if one of the other submitted modules 308 is the best performer, then that module may be renamed as Module K and replace the old Module K in the workflow.

The implementation of block 310 by declaring the best performing module may involve complexity and subtleties. One task in a challenge is to choose accurate metrics to compare and rank outputs that can be high dimensional sets of signals, materials and/or data. Another task is computing the statistical significance of submitted outputs to see if they are close enough to the reference output using the predetermined evaluation metrics. The statistical framework used for the verification can also be used to assign a risk that the verification was a fluke (e.g., computing a p-value). In an embodiment, verification criteria may include a quantitative metric of proximity to a predetermined threshold.

A community-based challenge can achieve multiple goals. First, a public challenge invites novel solutions and module designs not considered by single researchers or small groups. Second, an aggregated and/or integrated output assembled from the entire community of predictions can be more accurate than the output of any individual module. Third, the public discourse centered on a challenge, including conference presentations and papers on the best-performing module, can rapidly build a consensus in the community as to which approaches are the most fruitful for a given task.

Example 1

A first example comprises an internal challenge to verify a technology choice (Level of Noise Challenge). In this context, an "internal challenge" refers to a challenge that is run inside an organization in which a more established module 304 is used as test reference to verify another existing module 305 that would likely be newer and less well characterized. Thus for an internal challenge, only the two modules (ideal performing/well-established module 303 and existing module to verify 304) are considered. As previously defined, the challenge format entails the generation of a test input, a reference output and a scoring by a trusted third party based on predetermined metrics or criteria. As such, the internal challenge methodology entails more than just simple comparison of the outputs of two modules.

More specifically, a first example relates to the adoption by an organization of the Gene Titan System for gene expression profiling that Affymetrix introduced in the early part of 2009. This technology allows researchers to process hundreds of samples in one experiment with minimal hands-on time, thus enabling a considerable increased gene expression profiling throughput. While higher throughput is desirable, the quality of the results of the new technology is uncertain. Hence, researchers could perform an internal challenge to compare the Gene Titan platform with the more commonly used Affymetrix single cartridge technology, an established technology in the field. A first verification challenge may consist of profiling a gold standard mRNA references sample, containing known quantities of spiked RNA. These reference samples, when hybridized on both technology arrays, would allow for the comparison of the sensitivities and error levels of both technologies. The assessment, however, needs to be done by an objective third party who knows the composition of the reference sample, which is unknown to the experimenter using the Gene Titan platform. If the quality of the challenge results is sufficient, the Gene Titan technology is considered verified. Conversely, if the quality is insufficient, the new technology is not verified. However, as an added benefit, the challenge process can reveal strengths and weaknesses of the module in a complex workflow. Hence, the challenge process may suggest improvements to increase the data quality of the new technology or suggest methods to mitigate the weaker aspects of the module.

Example 2

A second example comprises an external challenge to verify a biomarker discovery module (Diagnostics Signature Challenge). In this context, an "external challenge" refers to a challenge that is run with participants from outside the organization that submits new modules (e.g., Modules L and M in FIG. 3). A test reference (ideal performing/well-established module 303) is also used to verify the submitted modules 308. As previously defined, the challenge format entails the generation of a test input, a reference output and a scoring by a trusted third party based on predetermined metrics or criteria. In an external challenge, a central feature is the broadcasting of the challenge and the collection and scoring of the submitted modules. This broadcasting can be done using communication channels such as social media networks, the Internet, printed media or a website describing the external challenge. In comparison, the internal challenge does not require the participation of outside parties to submit modules.

A biomarker is an indicator of a biological state. Biomarkers are commonly used for diagnostics, but are imperfect (for example, some markers are present in low levels in healthy patients, while others are non-specific, and just indicate the presence of one of several diseases instead of identifying the exact class or sub-type of disease). A signature is an integration of several biomarkers in which the measurements can be heterogeneous, but the combined information can potentially provide a more holistic and robust determination of disease state. Identification of such signatures opens many possibilities for patient stratification and personalized medicine.

In this example, the goal of a Diagnostics Signature Challenge is to verify that transcriptomics data contains enough information for the determination and prognosis of certain human disease states. Operationally, the challenge entails the following steps. Organizers will generate, procure or survey the public literature to produce a training set of gene expression data corresponding to two disease states (e.g., control vs. disease or Stage 1 cancer vs. Stage 2 cancer). For this example, the participants are permitted to use the training set plus any open literature information or other publicly available data. With this compendium of data at hand, the participants will generate hypotheses for the signature that can differentiate between the two disease states. As a test set, participants are given an independent, previously unseen panel of gene expression arrays that correspond to the two same disease states. In this set, the two diseases are confirmed using established standards (e.g., histopathology, clinical information or survival information); however, the outcomes are unknown to the participants. The challenge consists in identifying the disease state corresponding to each patient sample from the gene expression data.

The existence of a diagnostic signature for the disease state is verified if the proportion of correct identifications in the test set is sufficiently high from a statistical point of view. In one embodiment, the statistics analysis can involve comparing the submitted prediction based on the diagnostic signature to a random assignment of samples into one disease state or the other. In other embodiments, other metrics of accuracy can be implemented, including the area under the precision-recall curve, the area under the receiver operating characteristics curve, or other metrics that one skilled in the art may choose adequate. For any chosen one or many metrics, the submission can be compared to a null hypothesis that assumes that samples are classified into one state or the other based on a prior distribution. A computer and appropriate software can enable the easy generation of large numbers of instantiations of this or other appropriate null hypotheses. Hence, a p-value can be empirically generated from the fraction of the randomly generated predictions that exceed the accuracy of the actual predictions under scrutiny.

The external challenge provides for the collection of predictions from possibly many participants. If predictions are submitted from disparate and independent participants, then a relative statistic can be computed by comparing each submitted prediction to a pool of randomized predictions constructed by randomly sampling the state of disease of a sample from the predictions of the participants. In this case, the p-value reports the likelihood that by chance, the accuracy that a submitted prediction exceeds that of a similar set of predictions that are randomly extracted from the pool of submissions. Hence, a low p-value will indicate that the accuracy of such predictions exceeded the accuracy of the other submitted sets, and this event is highly unlikely to occur by chance. A computer and appropriate software is required to practicably enable the calculation of such p-values.

Figure 4:
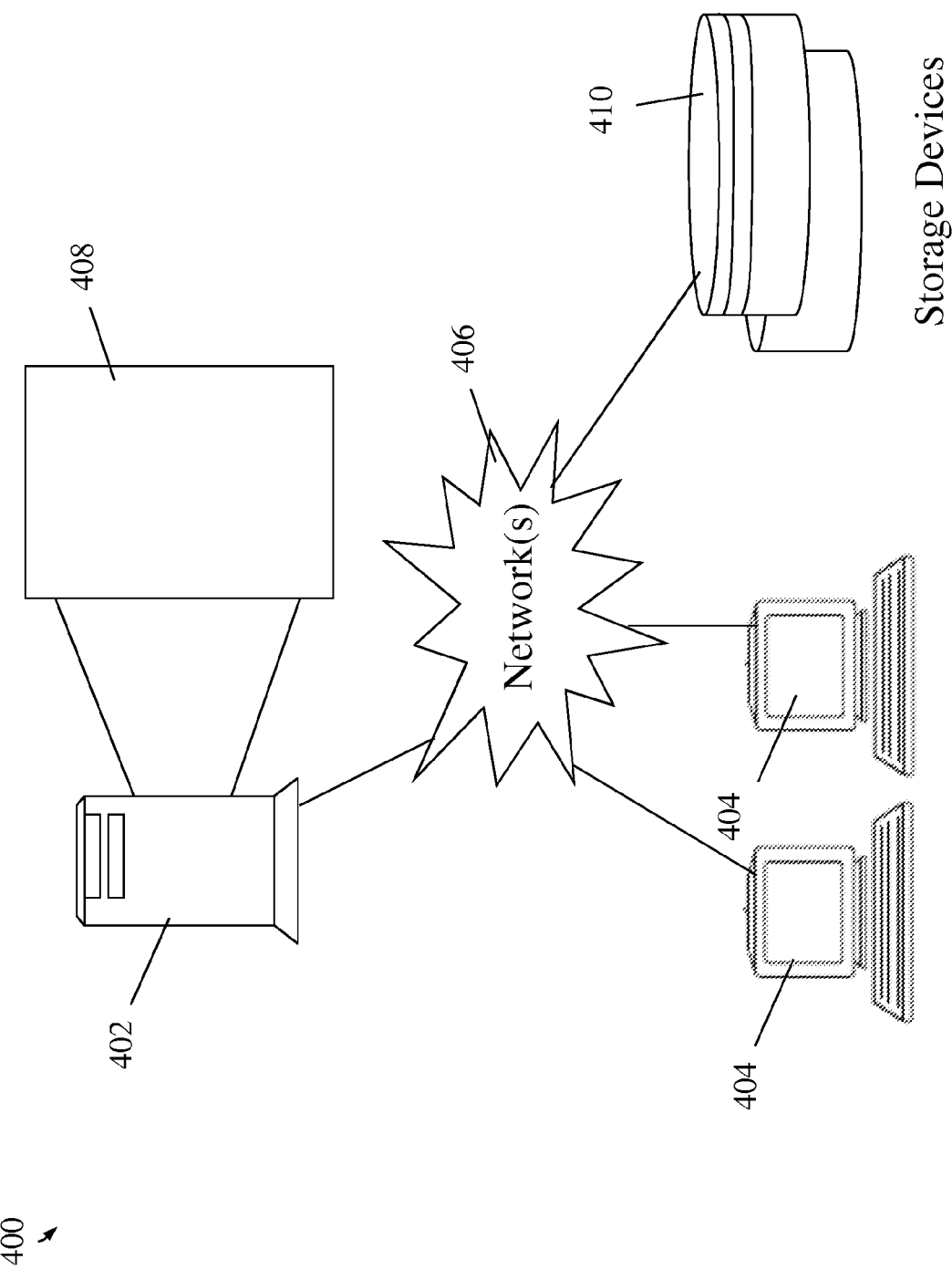
FIG. 4 is a schematic diagram illustrating an exemplary computing environment that may be used to implement embodiments of the module workflow verification processes.

Finally, FIG. 4 is a schematic diagram illustrating an exemplary computing environment 400 that may be used to implement embodiments of the module workflow verification processes. As shown in FIG. 4, the computing environment includes a host system computer 402 (e.g., a server) configured to execute computer instructions and may operate in any type of environment that is capable of executing a software application. The host system computer 402 may comprise a high-speed computer processing device, such as a mainframe computer, to manage the volume of operations governed by an entity for which the above described embodiment are executing. In an embodiment, the host system computer 402 is part of an enterprise (e.g., a commercial business).

As further shown in FIG. 4, the computing environment 400 includes one or more client systems 404 through which users at one or more geographic locations may contact the host system computer 402. The client systems 404 are coupled to the host system computer 402 via one or more networks 406. Each client system 404 may be implemented using a general-purpose computer executing a computer program for carrying out the processes described herein. The client systems 404 may be personal computers (e.g., a laptop, a tablet, a personal digital assistant, a mobile device) or host attached terminals. If the client systems 404 are personal computers, the processing described herein may be shared by a client system 404 and the host system computer 402 (e.g., by providing an applet to the client system 104). The client systems 404 may be operated by authorized users (e.g., programmers) of the embodiments described herein.

The networks 406 may be any type of known network including, but not limited to, a wide area network (WAN), a local area network (LAN), a global network (e.g., Internet), a virtual private network (VPN), and an intranet. The networks 406 may be implemented using a wireless network or any kind of physical network implementation known in the art. A given client system 404 may be coupled to the host system computer 402 through multiple networks (e.g., intranet and Internet) so that not all client systems 404 are coupled to the host system computer 402 through the same network. One or more of the client systems 404 and the host system computer 402 may be connected to the networks 406 in a wireless fashion. In one embodiment, the networks 406 include an intranet and one or more client systems 404 executing a user interface application (e.g., a web browser) to contact the host system computer 402 through the networks 406. In another embodiment, the client system 404 is connected directly (i.e., not through the networks 406) to the host system computer 402 and the host system computer 102 contains memory for storing data. Alternatively, a separate storage device (e.g., storage device 410) may be implemented for this purpose.

In an embodiment, the storage device 410 includes a data repository with data relating to the verification method embodiments, as well as other data/information desired by the entity representing the host system computer 402. The storage device 410 is logically addressable as a consolidated data source across a distributed environment that includes networks 406. Information stored in the storage device 410 may be retrieved and manipulated via the host system computer 402 and/or the client systems 404. In an embodiment, the storage device 410 includes one or more databases containing and corresponding configuration parameters, values, methods, and properties, as well as other related information as described above. It will be understood by those of ordinary skill in the art that the storage device 410 may also comprise other structures, such as an XML file on the file system or distributed over a network (e.g., one of networks 406), or from a data stream from another server located on a network 406. In addition, all or a portion of the storage device 410 may alternatively be located on a client system 404.

The host system computer 402 depicted in the architecture of FIG. 4 may be implemented using one or more servers operating in response to a computer program stored in a storage medium accessible by the server. The host system computer 402 may operate as a network server (e.g., a web server) to communicate with the client systems 404. The host system computer 402 handles sending and receiving information to and from the client systems 404 and can perform associated tasks. The host system computer 402 may also include a firewall to prevent unauthorized access to the host system computer 402 and enforce any limitations on authorized access. For instance, an administrator may have access to the entire system and have authority to modify portions of the system. A firewall may be implemented using conventional hardware and/or software as is known in the art.

The host system computer 402 may also operate as an application server. The host system computer 402 executes one or more computer programs to provide the functionality described above. As indicated above, processing may be shared by the client systems 404 and the host system computer 402 by providing an application (e.g., java applet) to the client systems 404. Alternatively, the client system 404 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of implementing verification of a complex workflow, the complex workflow having a number of inputs in the form of one or more of data, signals and materials, and a set of processing steps that yield a number of desired outputs in the form of one or more of data, signals and materials, the method comprising:
    partitioning the workflow into modules, wherein the modules also have inputs, processing steps and outputs;
    selecting, from the workflow, one or more of the partitioned modules for independent verification by challenge thereof;
    wherein the challenge comprises a community-based challenge in which outputs from modules of external participants are compared with the outputs of the selected module and the reference outputs of the ideal performing module or well-established module;
    running, with a computing device, a challenge of the selected module, the challenge comprising comparing reference outputs to outputs of the selected module, wherein reference inputs are received by the selected module and the reference outputs are generated using the reference inputs and one of an ideal performing module or a well established module, wherein the challenge is implemented with at least one of a double blind approach, and crowd sourcing of a problem to a community;
    determining whether outputs of the selected module meet verification criteria with respect to the reference outputs, and based on the determining, implementing one of:
    declaring the selected module verified and in the event a best performer is determined to result from an external participant replacing the selected module in the workflow;
    subdividing the selected module into smaller modules and repeating the challenge on the smaller modules; or
    declaring the selected module not verified, wherein verification comprises a process of evaluating a system, component, product or research output to determine whether the module meets projected performance or accuracy goals.

2. The method of claim 1, wherein the challenge comprises an internal challenge with respect to an organization such that the outputs of the selected module are compared only with the reference outputs of the ideal performing module or well-established module.

3. The method of claim 1, wherein the community-based challenge comprises at least two external participants.

4. The method of claim 3, wherein information regarding the best performer is received by a third party entity with respect to the computing device and any of the external participants.

5. The method of claim 4, wherein the identities of the external parties are unknown to the third party entity, the third party entity performing a ranking of the outputs of the external participant modules, the outputs of the selected module and the reference outputs.

6. The method of claim 1, further comprising determining whether a best performer of the outputs of the external participant modules and the outputs of the selected module meet the verification criteria with respect to the reference outputs.

7. The method of claim 1, wherein the verification criteria comprise a quantitative metric of proximity to a predetermined threshold.

8. The method of claim 1, wherein the ideal performing module is determined by one or more of theoretical modeling, statistical averaging over large datasets, and the use of a priori knowledge.

9. The method of claim 1, wherein the complex workflow comprises one of the following domains: industrial manufacturing, industrial research and development, academic scientific research, and information technology.

10. A non-transitory, computer readable storage medium having computer readable instructions stored thereon that, when executed by a computer, implement a method of verification of a complex workflow, the complex workflow having a number of inputs in the form of one or more of data, signals and materials, and a set of processing steps that yield a number of desired outputs in the form of one or more of data, signals and materials, the method comprising:
- partitioning the workflow into modules, wherein the modules also have inputs, processing steps and outputs;
- selecting, from the workflow, one or more of the partitioned modules for independent verification by challenge thereof;
- wherein the challenge comprises a community-based challenge in which outputs from modules of external participants are compared with the outputs of the selected module and the reference outputs of the ideal performing module or well-established module;
- running, with a computing device, a challenge of the selected module, the challenge comprising comparing reference outputs to outputs of the selected module, wherein reference inputs are received by the selected module and the reference outputs are generated using the reference inputs and one of an ideal performing module or a well established module, wherein the challenge is implemented with at least one of a double blind approach, and crowd sourcing of a problem to a community;
- determining whether outputs of the selected module meet verification criteria with respect to the reference outputs, and based on the determining, implementing one of:
- declaring the selected module verified and in the event a best performer is determined to result from an external participant replacing the selected module in the workflow;
- subdividing the selected module into smaller modules and repeating the challenge on the smaller modules; or
- declaring the selected module not verified, wherein verification comprises a process of evaluating a system, component, product or research output to determine whether the module meets projected performance or accuracy goals.

11. The computer readable storage medium of claim 10, wherein the challenge comprises an internal challenge with respect to an organization such that the outputs of the selected module are compared only with the reference outputs of the ideal performing module or well-established module.

12. The computer readable storage medium of claim 10, wherein the community-based challenge comprises at least two external participants.

13. The computer readable storage medium of claim 12, wherein information regarding the best performer is received by a third party entity with respect to the computing device and any of the external participants.

14. The computer readable storage medium of claim 13, wherein the identities of the external parties are unknown to the third party entity, the third party entity performing a ranking of the outputs of the external participant modules, the outputs of the selected module and the reference outputs.

15. The computer readable storage medium of claim 10, wherein the method further comprises determining whether a best performer of the outputs of the external participant modules and the outputs of the selected module meet the verification criteria with respect to the reference outputs.

16. The computer readable storage medium of claim 10, wherein the verification criteria comprise a quantitative metric of proximity to a predetermined threshold, the metric of proximity computed using computer readable instructions stored in the readable storage medium.

17. The computer readable storage medium of claim 10, wherein the ideal performing module is determined by one or more of theoretical modeling, statistical averaging over large datasets, and the use of a priori knowledge.

18. The computer readable storage medium of claim 10, wherein the complex workflow comprises one of the following domains: industrial manufacturing, industrial research and development, academic scientific research, and information technology.

* * * * *